US007643244B1

(12) United States Patent
Money

(10) Patent No.: US 7,643,244 B1
(45) Date of Patent: Jan. 5, 2010

(54) INTEGRATED BATTERY POWERED HARD DISK DRIVE

(76) Inventor: James Bryant Money, 1360 Santa Inez Dr., San Jose, CA (US) 95125

( * ) Notice: Subject to any disclaimer, the term of this patent is extended or adjusted under 35 U.S.C. 154(b) by 711 days.

(21) Appl. No.: 11/282,148

(22) Filed: Nov. 18, 2005

Related U.S. Application Data

(60) Division of application No. 10/419,336, filed on Apr. 21, 2003, now Pat. No. 7,042,675, which is a continuation-in-part of application No. 09/827,119, filed on Apr. 5, 2001, now Pat. No. 6,678,120, and a continuation-in-part of application No. 09/932,684, filed on Aug. 20, 2001, now Pat. No. 6,713,909.

(51) Int. Cl.
*G11B 33/14* (2006.01)

(52) U.S. Cl. .................................. 360/97.02

(58) Field of Classification Search ...... 360/97.01–98.4
See application file for complete search history.

(56) References Cited

U.S. PATENT DOCUMENTS 4,974,103 A * 11/1990 Iftikar et al. ............. 360/97.01
6,650,961 B2 * 11/2003 Deckers ...................... 700/213

* cited by examiner

*Primary Examiner*—A. J. Heinz

(57) ABSTRACT

Disclosed is a mobile Integrated Battery Powered Hard Disk Drive (IBP-HDD) equipped with USB OTG capabilities for direct connection to other USB devices, such as cell phones, PDAs, MP3 players, GPS, digital camcorders, digital cameras and other devices. These drives come in all form factors and combine high storage capacity and performance with low power consumption and portable operation. One component of the integrated drives is the base upon which all components and assemblies of the HDD have been mounted to produce a Drive-On-A-Substrate. A cover mounts to the base and separates each component and assembly into isolated compartments that can be evacuated of air and refilled with inert gases for improved performance and reliability. A first embodiment of the invention involves a method to manufacture a base. A second embodiment of the invention involves a method to manufacture an integrated battery powered hard disk drive portion on a base. A third embodiment involves a method to assemble an integrated battery powered hard disk drive.

6 Claims, 10 Drawing Sheets

INTEGRATED BATTERY POWERED HARD DISK DRIVE

CROSS REFERENCE TO RELATED APPLICATIONS

This application is a divisional patent application of U.S. Pat. No. 7,042,675, issued May 9, 2006, entitled "Hermetically Sealed Mobile Hard Disk Drive Utilizing a Base Made of a Ceramic Substrate," based on a utility patent application Ser. No. 10/419,336, filed by the same inventor on Apr. 21, 2003; which is a continuation-in-part application of U.S. Pat. No. 6,678,120, issued Jan. 13, 2004, entitled "Multiple-Modular Actuators Having a Common Axis of Rotation," based on a U.S. utility patent application Ser. No. 09/827,119, filed by the same inventor on Apr. 5, 2001; and a continuation-in-part application of U.S. Pat. No. 6,713,909, issued Mar. 30, 2004, entitled "Digitally Controlled Variable Speed Integrated Planar Motor Assembly," based on a U.S. utility patent application Ser. No. 09/932,684, filed by the same inventor on Aug. 20, 2001, which are hereby incorporated by reference.

BACKGROUND

1. Field of Invention

This invention relates to the design and manufacturing of a series of small form factor battery powered hard disk drives that can connect directly, and exchange data, with any other device having a Universal Serial Bus (USB) port, or an equivalent port.

2. Description of Prior Art

There is a growing need for mobile peripherals to communicate directly with each other over a USB port when a PC is not available, and this is accomplished by the On-The-Go (OTG) supplement. Unlike the PC, an OTG device cannot supply power, so the mobile peripheral has to have a self-contained, integrated battery large enough to allow for prolonged periods of operation. There are no such hard disk drives (HDDs) in the market today that satisfy this requirement, while the number of USB OTG equipped devices continue to grow.

In view of the foregoing, what is needed are improved design and manufacturing methods to efficiently manufacture integrated battery powered hard disk drives.

SUMMARY OF THE INVENTION

The present invention includes design and manufacturing methods that overcome the deficiencies of the prior art, and can be used for various types of drives. The invention can be implemented in several alternative ways to build different sizes of hard disk drives. Three aspects of the invention are described below.

A first aspect of the invention is directed to a method to manufacture a substrate. The method includes preparing a front surface of a substrate having a front surface and a back surface; depositing a magneto-resistive material on the front surface of the substrate; depositing a first conductor layer on the magneto-resistive material on the front surface of the substrate; depositing a first photoresist layer on the first conductor layer; exposing and developing the first photoresist layer; substantially removing the conductor layer and the magneto-resistive material from areas not covered by the first photoresist layer; depositing a seed layer on the front surface of the substrate; depositing a second photoresist layer on the seed layer; exposing and developing the second photoresist layer; depositing a second conductor layer onto the second photoresist layer; stripping the second photoresist layer; substantially removing the seed layer by an etch process; depositing a metal oxide layer on the front surface of the substrate; lapping and polishing the metal oxide layer; depositing a third photoresist layer on the metal oxide layer on the front surface the substrate; exposing and developing the third photoresist layer to define a plurality of vias to the second conductor layer; and substantially etching the metal oxide layer to the second conductor layer.

A second aspect of the invention is directed to a method to manufacture an integrated battery powered hard drive. The method includes depositing a conductive seed layer on a metal oxide layer; depositing a photoresist layer on the metal oxide layer; exposing and developing the photoresist layer to define a plurality of spiral stator coils; depositing a conductor layer onto the photoresist layer; stripping the photoresist layer; and substantially removing the conductive seed layer by an etching process to form a base with a plurality of stator coils for later assembly of an integrated battery powered hard disk drive.

A third aspect of the invention is directed to a method of assembling an integrated battery powered hard disk drive. The method includes attaching a spindle on a front surface of a base, wherein the front surface has a spindle shaft; attaching one or more actuator assemblies on the front surface of the base; aligning a cover to the front surface of the base; assembling the cover and the front surface of the base to form a plurality of chambers; and sealing the chambers to hermetically contain at least one gas inside at least one chamber.

These and other objects and advantages of the invention will become apparent to those skilled in the art from the following detailed description of the invention and the accompanying drawings.

DETAILED DESCRIPTION OF THE PREFERRED EMBODIMENT

This application describes a series of small form factor Integrated Battery Powered HDDs, equipped with OTG capabilities. There are three major components comprising a mobile HDD.

1) Head/Disk Assembly (Actuator and Spindle Motor)
2) Electronics (Integrated Circuits)
3) Power (Battery)

The Integrated Battery Powered Hard Disk Drive (IBP-HDD) assembles and integrates these components onto a substrate (e.g., a ceramic substrate, or an equivalent substrate) that is manufactured with processes and equipment common to the semiconductor industry. The present invention provides:

- an IBP-HDD with USB On-The-Go technology.
- a dual-role IBP-HDD that has limited host capability.
- an IBP-HDD for "peer-to-peer" or direct connection among all USB equipped devices.
- a ceramic base that integrates all electrical components on a high strength ceramic substrate which is manufactured, in high volume, by processes and equipment common to the semiconductor industry.
- an IBP-HDD where the head-disk assembly, the integrated battery and the integrated circuits are contained in separate and sealed chambers.
- an IBP-HDD where each chamber can be evacuated and pressurized with selected inert gases.
- an IBP-HDD that consumes very low power.
- an IBP-HDD that operates in a wide range of environments even under water or in space.

DESCRIPTION

FIGS. 1-9

Figure 1:
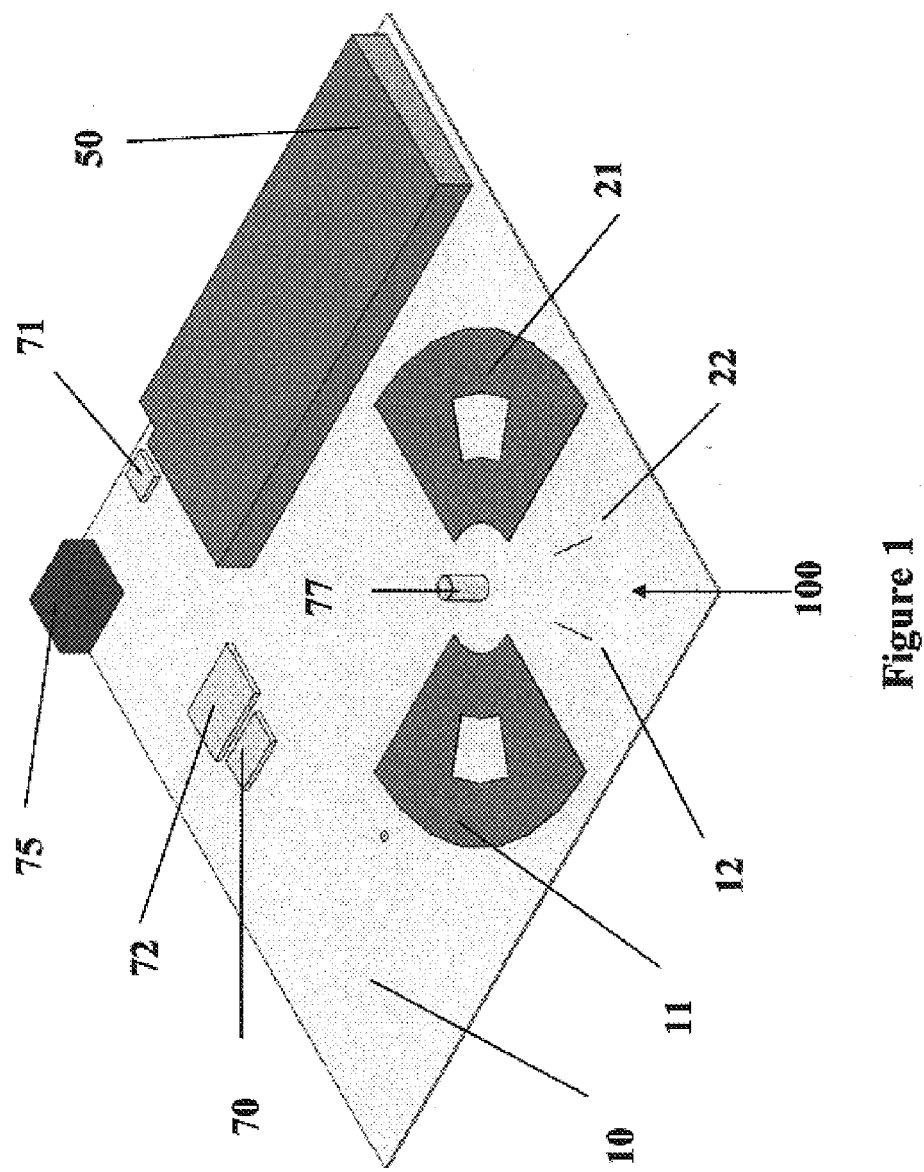
FIG. 1 shows a 3-dimensional view of the Ceramic Base, in accordance with one embodiment of the invention.

FIG. 1 shows a 3-dimensional view of the Ceramic Base 100, a key and enabling component of the IBP-HDD. The Ceramic Base was manufactured on ceramic substrate 10 using the following materials and processes.

1: In one embodiment, ceramic substrate 10 is manufactured with an Yttria-Partially Stabilized Zirconia (YTZP) material whose salient properties are given in Table 1. This material exhibits excellent strength and fracture toughness and is able to absorb the high energy of impact without shattering or deforming.

TABLE 1

| Yttria-Partially Stabilized Zirconia (YTZP) (As per CoorsTek, a manufacturer of Technical Ceramics) | |
|---|---|
| Density | 6.02 (grams/cm$^3$) |
| Flexural Strength | 1,300 (MPa) |
| Fracture Toughness | 13 (MPa*m$^{1/2}$) |
| Compressive Strength | 2,500 (MPa) |
| Coefficient of Linear Expansion | 10.3 (10$^{-6}$/° C.) |
| Thermal Conductivity | 2.2 (W/m*° K.) |

2: The MR stripes 12 and 22 are fabricated by sputtering a magneto-resistive material, such as 80-20 Nickel-Iron (Ni—Fe), followed by a first conductor layer (e.g., a film of copper). Photoresist is applied, exposed and developed and then the substrate is sputter-etched, or ion-milled, to remove the magneto-resistive material and first conductor layer (e.g., copper-Ni—Fe material) not covered with photoresist.

3: IC interconnect traces (not shown) are fabricated by electroplating a second conductor layer (e.g., a copper layer) onto a photoresist mask.

4: A film of metal oxide (e.g., aluminum oxide ($Al_2O_3$) or equivalent) is sputter deposited on substrate 10 and then lapped and polished with a process (e.g., a process such as CMP (Chemical Mechanical Planarization) or an equivalent process).

5: Photoresist is applied and openings are etched back to the copper interconnects.

6: The fabrication of the spindle motor stator coils 11 and 21 starts with the sputtering of a copper seed layer followed by the application of an ultra-thick photoresist (20-100 microns) on the lapped $Al_2O_3$ formed by step 4. The substrate is exposed with a photo mask defining the spiral coil pattern, developed and copper is electroplated into the openings with the thickness of the copper equal to the photoresist thickness. The photoresist is stripped and the copper seed layer is removed by etching. These resists, such as the Shipley BRP100 or the Clariant AZ PLP 100XT, can achieve aspect ratios of 10 to 1 (height/width) with near vertical walls and optimized for the fabrication of copper electroplated conductors.

7: Mount "bumped" IC's, 70 (actuator and spindle motor control), 72 (CE-ATA SOC) and 71 (power mgt and battery charging) and the USB OTG connector 75 using a solder re-flow operation.

8: Mount custom Lithium Polymer battery, 50.

9: A YTPZ Zirconia spindle motor shaft 77 is bonded to substrate 10 in a fixture to ensure its extension and perpendicularity to substrate 10.

Figure 2:
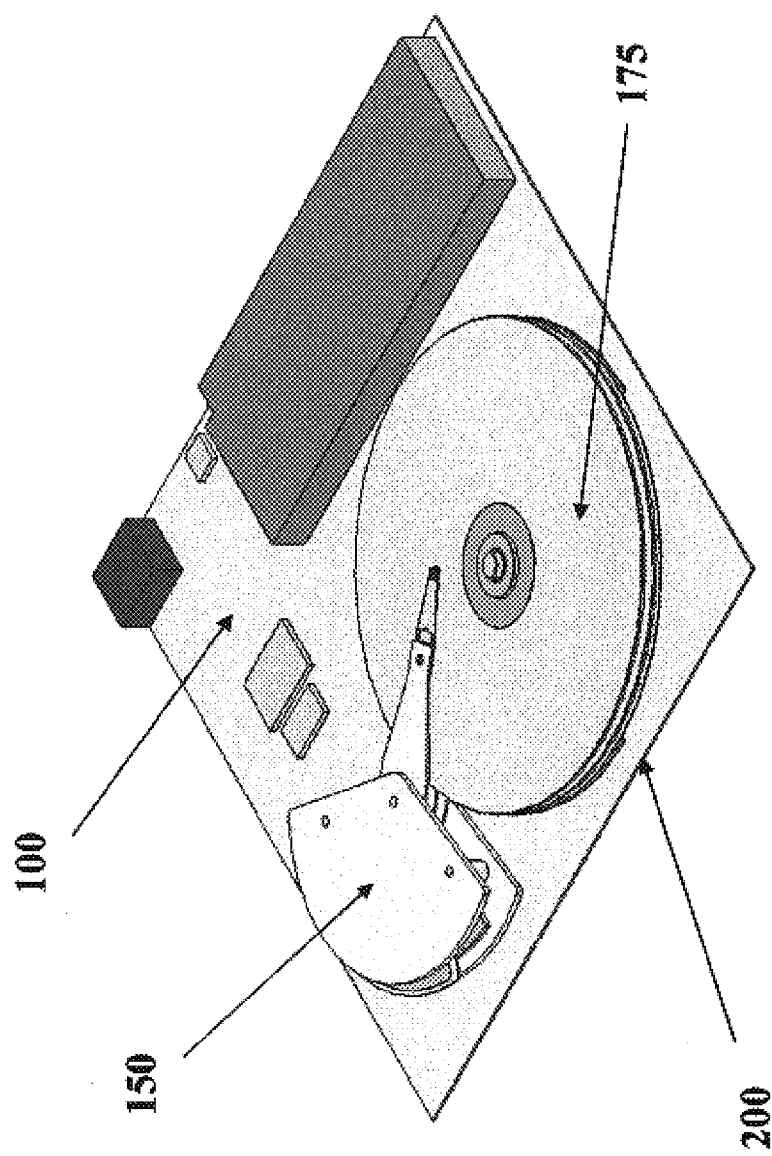
FIG. 2 shows a 3-dimensional view of the Drive On A Substrate, in accordance with one embodiment of the invention.

FIG. 2 shows a 3-dimensional view of the Drive-On-A-Substrate 200, consisting of Ceramic Base 100, Actuator assembly 150, and Spindle Motor assembly 175. In the preferred embodiment, the Actuator and Spindle Motor assemblies are high torque to inertia devices requiring minimal current for high performance operation. The HDD is now functional and can be servo-written, formatted, and tested.

Figure 3:
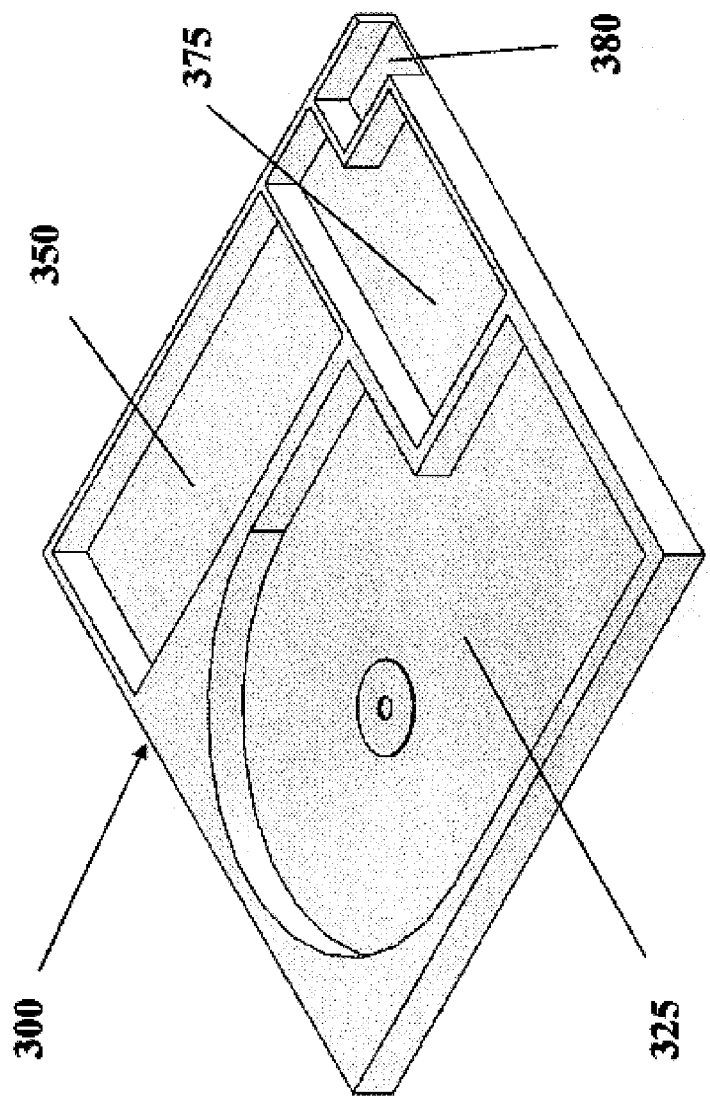
FIG. 3 shows a 3-dimensional view of the Ceramic Cover, in accordance with one embodiment of the invention.

FIG. 3 shows a 3-dimensional view of the Ceramic Cover 300, for the IBP-HDD. In one embodiment of the invention, it is manufactured by an injection molded process using the same material as used for the ceramic substrate 10. Key features are:

- Head-Disk Assembly cavity 325.
- Battery cavity (e.g., a lithium polymer battery cavity) 350.
- Integrated circuits cavity 375.
- USB OTG connector cavity 380.

Figure 4:
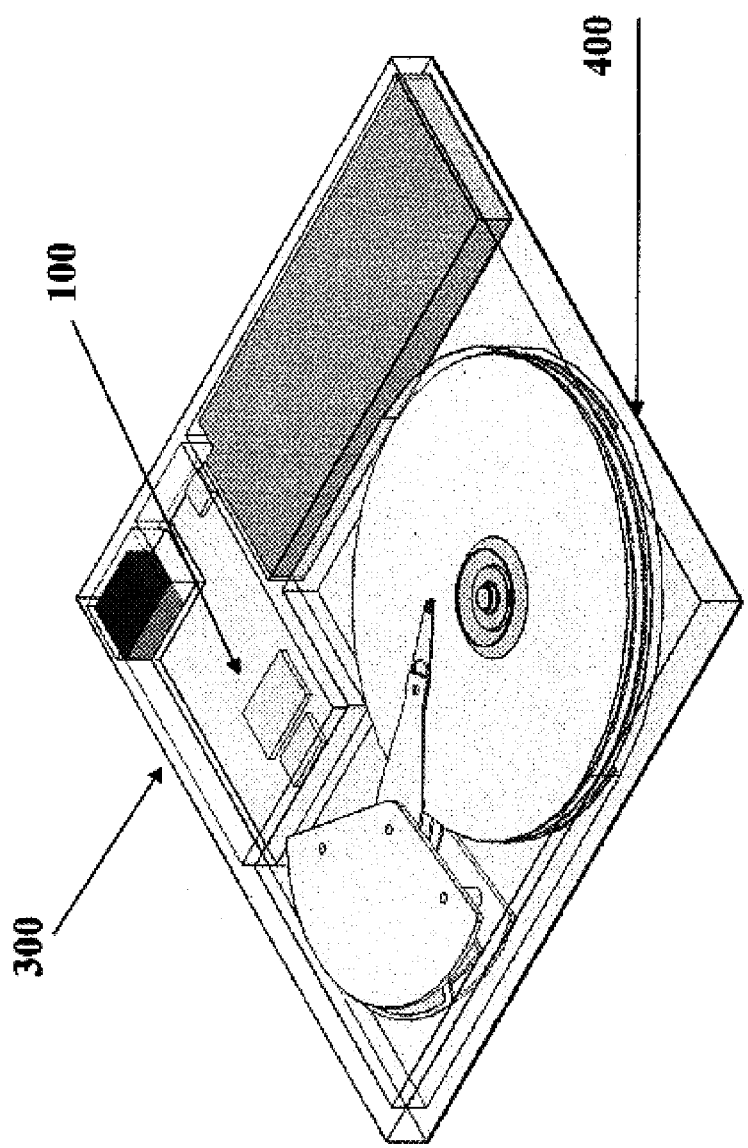
FIG. 4 shows a 3-dimensional view of the final assembly of the Integrated Battery Powered Hard Disk Drive (IBP-HDD), in accordance with one embodiment of the invention.

FIG. 4 shows a 3 dimensional view of the final assembly of the IBP-HDD 400. Ceramic Cover 300 (shown as transparent), is bonded to Ceramic Base 100, forming an impervious seal between the Ceramic Cover 300 and Ceramic Base 100.

Figure 5:
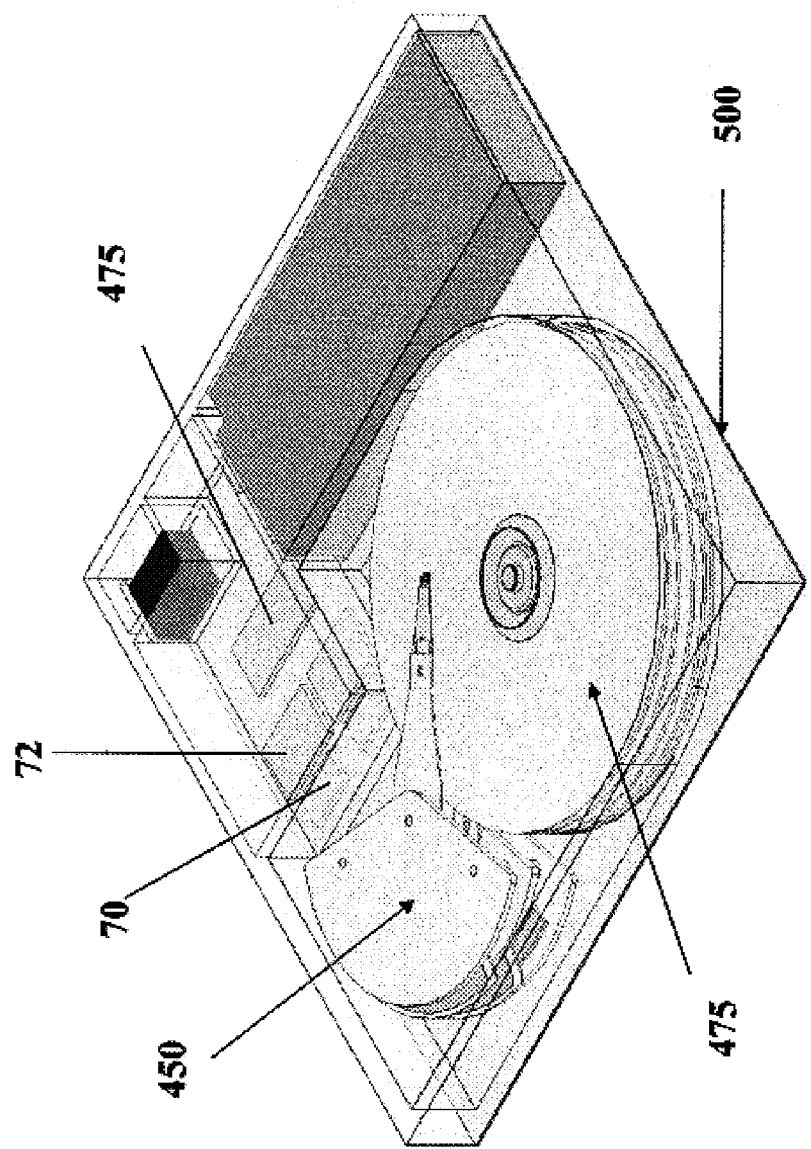
FIG. 5 shows a 3-dimensional view of the final assembly of the Dual Actuator IBP-HDD, in accordance with one embodiment of the invention.

FIG. 5 shows a 3-dimensional view of the final assembly of a Dual-Actuator IBP-HDD, 500. Manufacturing and assembly is identical to IBP-HDD 400 except:

1) The single module actuator 150 has been replaced with a dual-module actuator 450.
2) The two-disk spindle motor 175 has been replaced with a four-disk spindle motor 475.
3) Additional ICs 70 and 72 have been added to accommodate the additional actuator module and its GMR heads.
4) An IC 475 is for the Dual-Porting of the two modular actuators into a single USB OTG port.
5) A thicker Lithium Polymer battery is used.

The use of washers to provide appropriate spacing between the various components on the spindle is extensively described in U.S. Pat. No. 6,713,909 issued to the inventor, entitled "Digitally Controlled Variable Speed Integrated Planar Motor Assembly," which is hereby incorporated by reference.

Figure 6A:
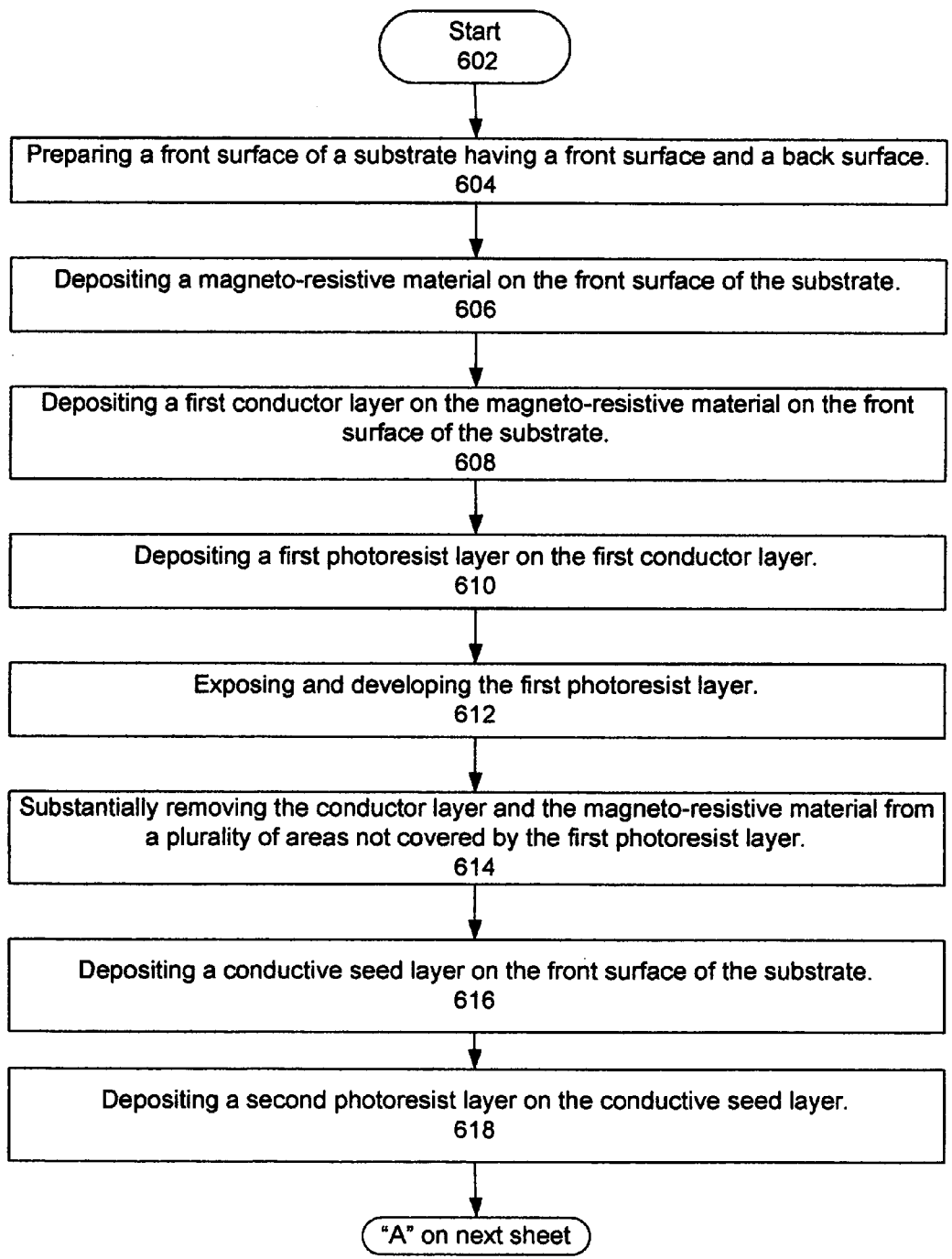
FIG. 6 (parts A and B) illustrates a flowchart of a method to manufacture a substrate, in accordance with one embodiment of the invention.
Figure 6B:
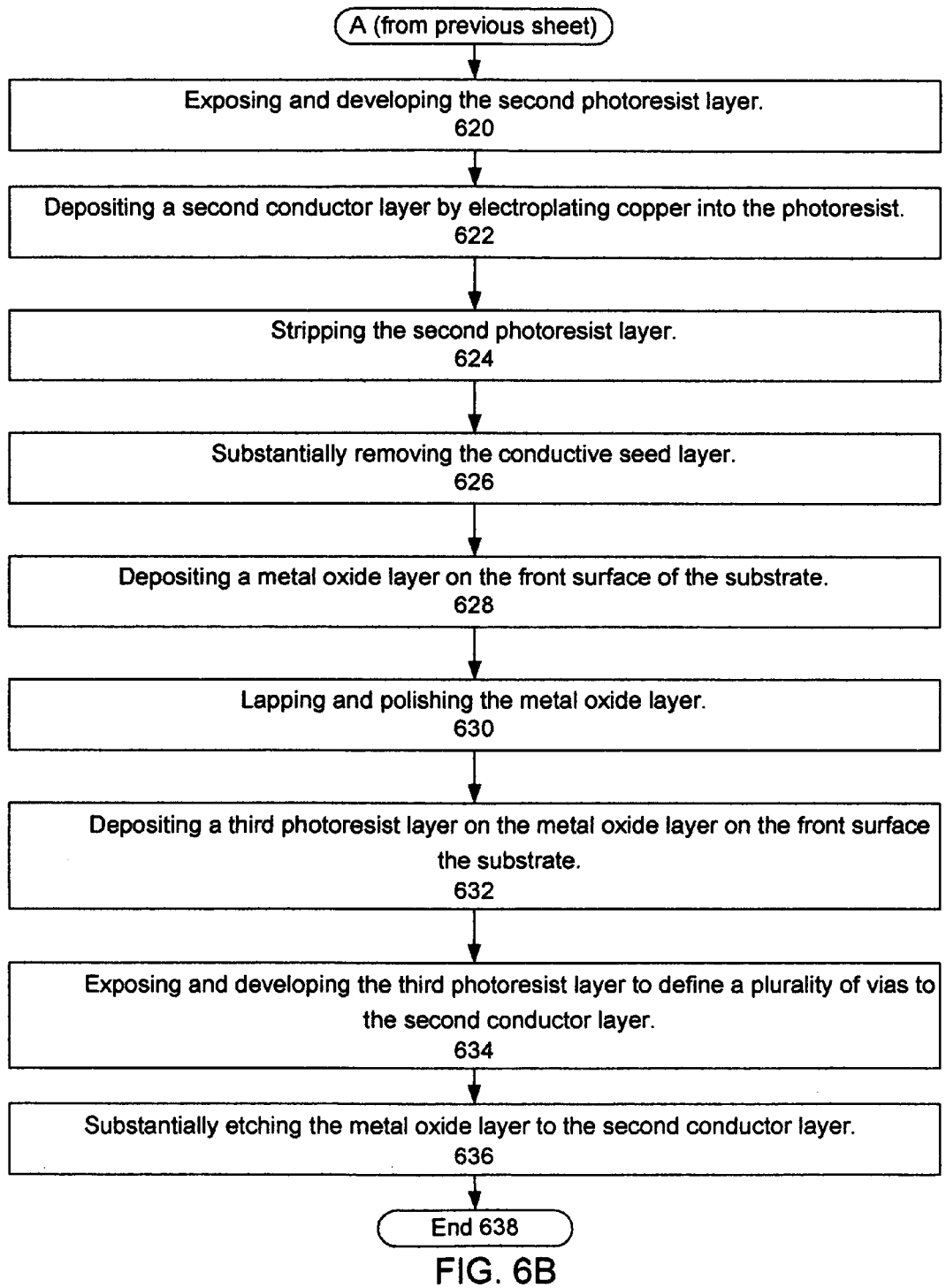

FIG. 6 (parts A and B) illustrates a flowchart for a method of manufacturing a substrate, in accordance with one embodiment of the invention. The method begins in operation 602. The next operation is 604 and includes preparing (e.g., lapping and polishing, or equivalent) a front surface of a substrate having a front surface and a back surface. The substrate can include any appropriate substrate material (e.g., a ceramic, a glass, or equivalents). The next operation is 606 and includes depositing a magneto-resistive material on the front surface of the substrate. The next operation is 608 and includes depositing a first conductor layer on the magneto-resistive material on the front surface of the substrate. The next operation is 610 and includes depositing a first photoresist layer on the first conductor layer. The next operation is 612 and includes exposing and developing the first photoresist layer. The next operation is 614 and includes substantially removing the conductor layer and the magneto-resistive material from a plurality of areas not covered by the first photoresist layer. The next operation is 616 and includes depositing a seed layer (e.g., including copper or an equivalent) on the front surface of the substrate. The next operation is 618 and includes depositing a second photoresist layer on the seed layer. The next operation is 620 and includes exposing and developing the second photoresist layer. The next operation is 622 and includes depositing a second conductor layer (e.g., including copper or an equivalent) onto the second photoresist layer. The next operation is 624 and includes stripping the second photoresist layer. The next operation is 626 and includes substantially removing the seed layer by an etch process. The next operation is 628 and includes depositing a metal oxide layer (e.g., including aluminum oxide or an equivalent) on the front surface of the substrate. The next operation is 630 and includes lapping and polishing the metal oxide layer. The next operation is 632 and includes depositing a third photoresist layer on the metal oxide layer on the front surface the substrate. The next operation is 634 and includes exposing and developing the third photoresist layer to define a plurality of vias to the second conductor layer. The next operation is 636 and includes substantially etching the metal oxide layer to the second conductor layer. The method ends in operation 638.

Figure 7:
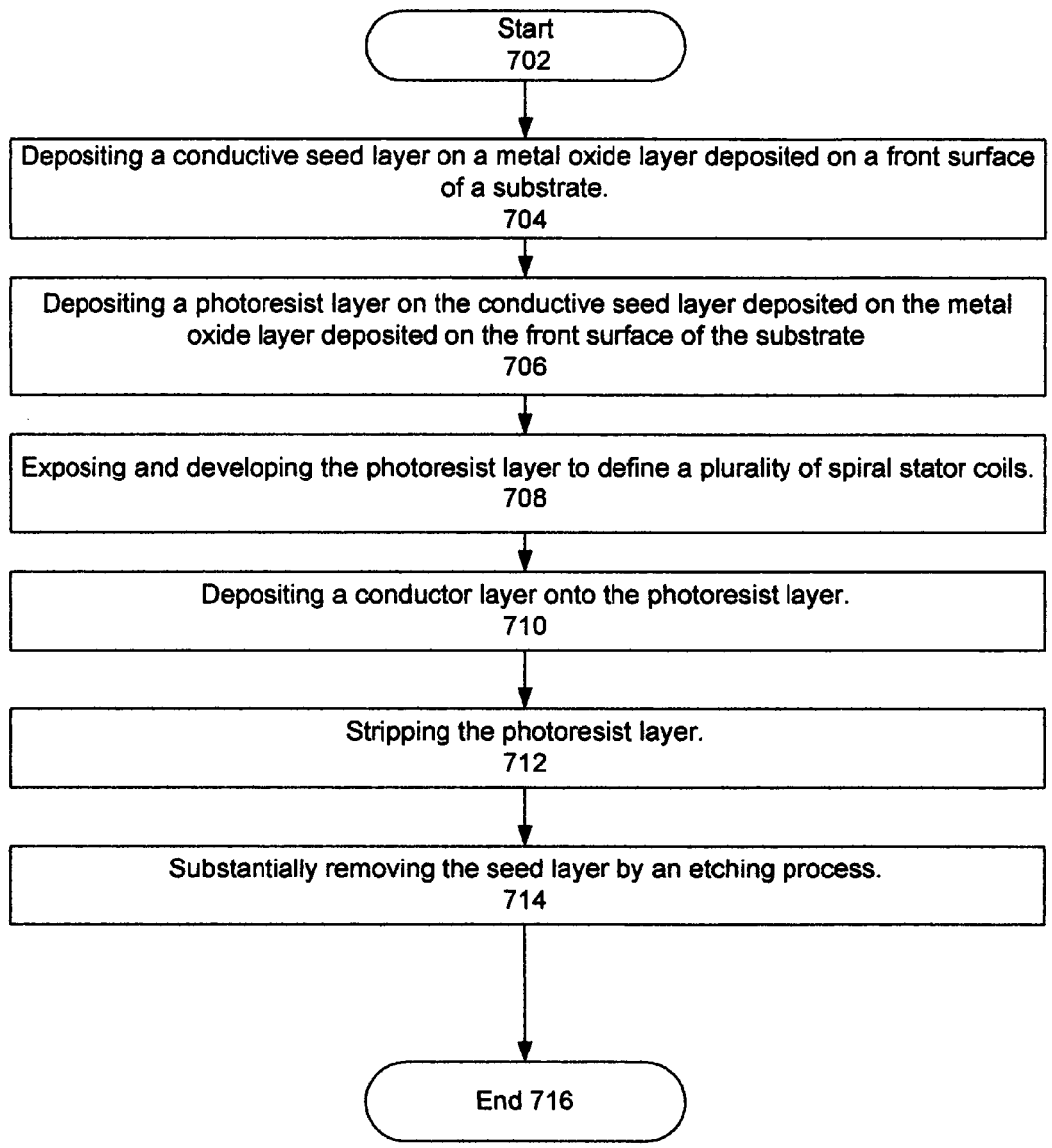
FIG. 7 illustrates a flowchart of a method to manufacture an integrated battery powered hard disk drive, in accordance with one embodiment of the invention.

FIG. 7 illustrates a flowchart of a method to manufacture an integrated battery powered hard disk drive, in accordance with one embodiment of the invention. The method starts in operation 702. The next operation 704 and includes depositing a conductive seed layer on an existing metal oxide layer. The next operation is 706 and includes depositing a photoresist layer on the conductive seed layer on the metal oxide layer. The next operation is 708 and includes exposing and developing the photoresist layer to define a plurality of spiral stator coils. The next operation is 710 and includes depositing a conductor layer (e.g., by electroplating copper) onto the photoresist layer. The next operation is 712 and includes stripping the photoresist layer. Stripping could include chemical stripping, plasma etch stripping, or an equivalent process. The next operation is 714 and includes substantially removing the conductive seed layer by an etching process. The method ends in operation 716.

Figure 8:
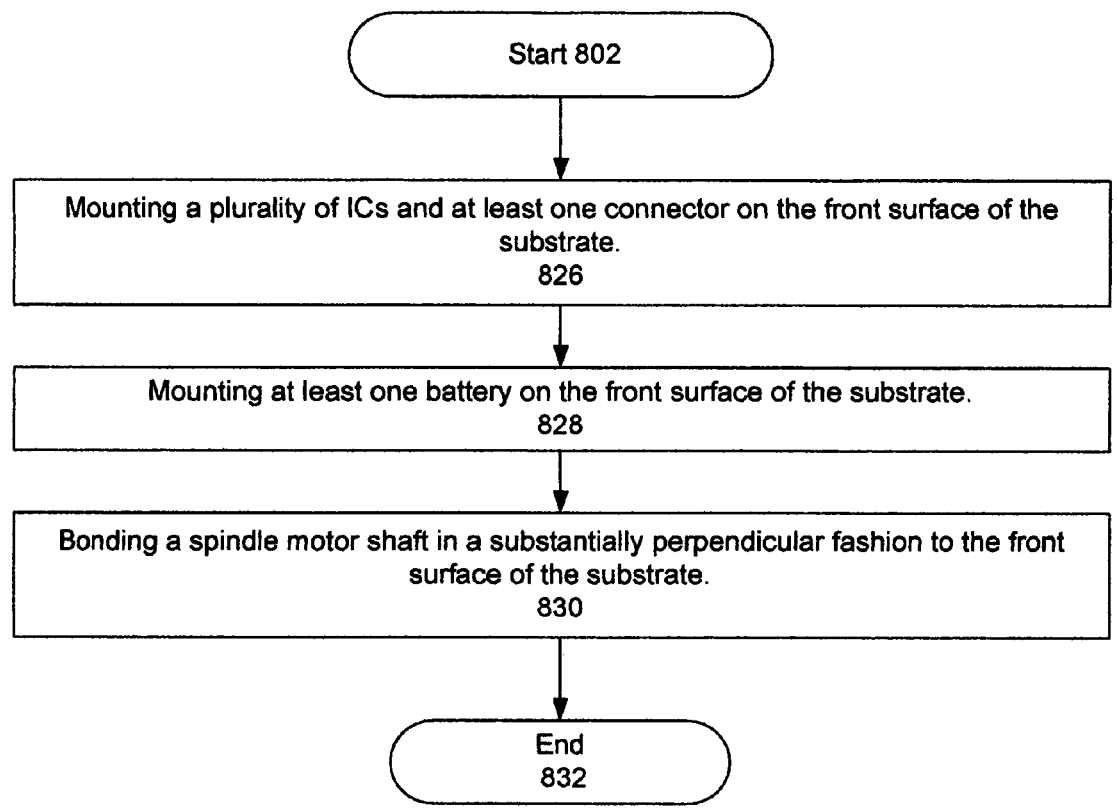
FIG. 8 illustrates a flowchart of a method to manufacture an integrated battery powered hard disk drive, in accordance with one embodiment of the invention.

FIG. 8 illustrates a flowchart of a method to manufacture an integrated battery powered hard disk drive, in accordance with one embodiment of the invention. The method starts in operation 802. The next operation is 826 and includes mounting a plurality of ICs and at least one connector on the front surface of the substrate. The next operation is 828 and includes mounting at least one battery on the front surface of the substrate. The next operation is 830 and includes bonding a spindle motor shaft in a substantially perpendicular fashion to the front surface of the substrate. This forms a base for later assembly of an integrated battery powered hard disk drive. The method ends in operation 832.

Figure 9:
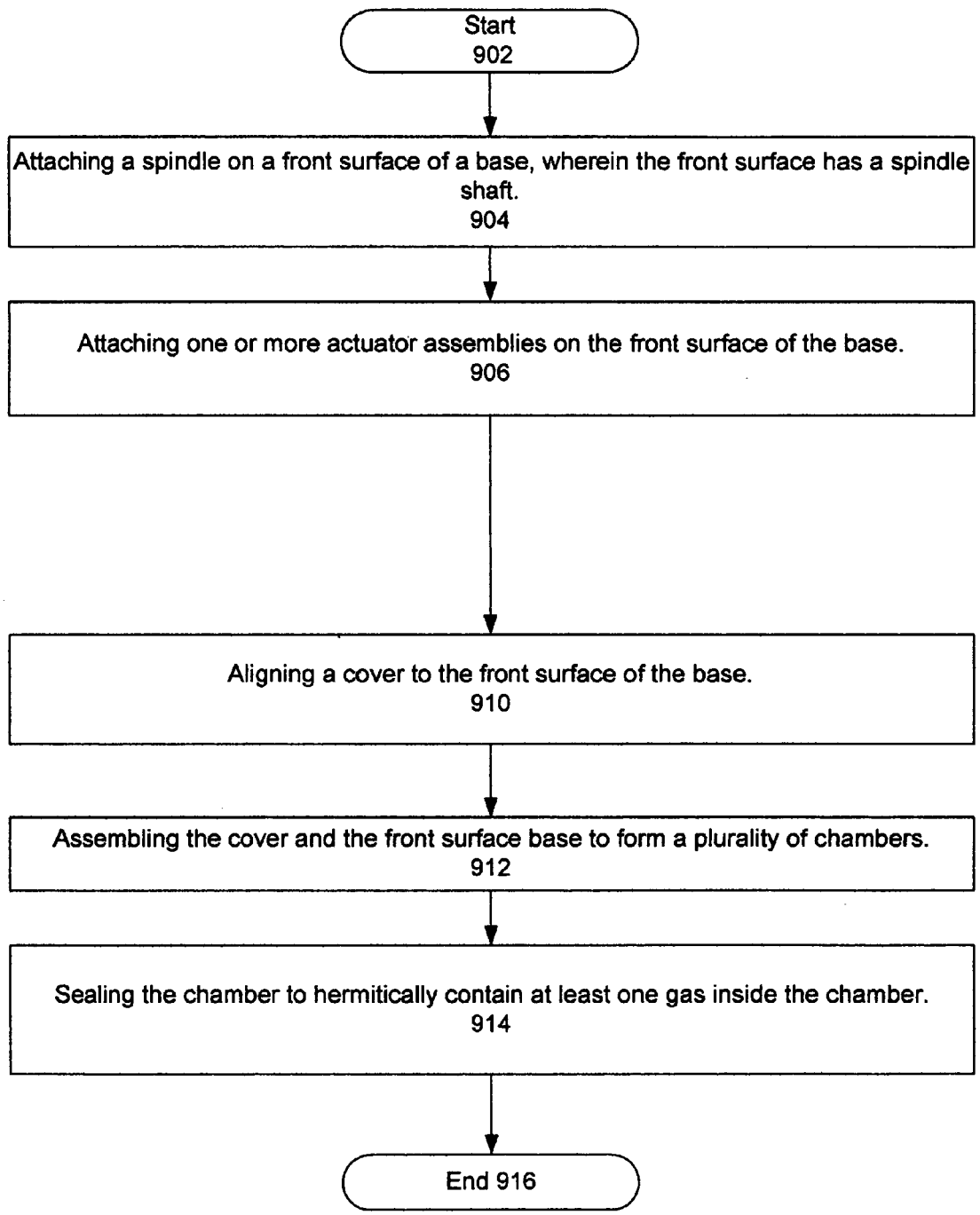
FIG. 9 illustrates a flowchart of a method of assembling an integrated battery powered hard disk drive, in accordance with one embodiment of the invention.

FIG. 9 illustrates a flowchart for a method of assembling an integrated battery powered hard disk drive, in accordance with one embodiment of the invention. The method begins in operation 902. The next operation is 904 and includes attaching a spindle on a front surface of a base, wherein the front surface has a spindle shaft. The next operation is 906 and includes attaching one or more actuator assemblies on the front surface of the base. The next operation is 910 and includes aligning a cover to the front surface of the base. The next operation is 912 and includes assembling the cover and the front surface of the base to form a plurality of chambers. The next operation is 914 and includes sealing the chambers to hermetically contain at least one gas inside at least one chamber. The method ends in operation 916.

CONCLUSIONS, RAMIFICATIONS AND SCOPE

Accordingly, the reader will see that IBP-HDD of this invention, has shown and demonstrated;
1) a IBP-HDD having USB OTG technology
2) a IBP-HDD having dual-role (limited host) for peer-to-peer connection and data exchanges
3) a Ceramic Base that integrates all components of the IBP-HDD to produce a Drive-On-A-Substrate.
4) an IBP-HDD having high performance with ultra-low power consumption.
5) An IBP-HDD that is battery powered and that can be re-charged when attached to a PC.
6) an IBP-HDD where the Ceramic Base is manufactured using processes and equipment common to the semiconductor industry.
7) an IBP-HDD where the head-disk assembly, the integrated battery and the integrated circuits are contained in separate and sealed chambers.
8) an IBP-HDD with the head-disk assembly chamber enclosed in a hermetically sealed chamber which has been filled with a low viscosity gas, at below ambient pressure, to reduce power and enhance performance.

Many variations of the invention are possible. For example, the ceramic base and the ceramic cover could be made from other materials, use other semiconductor processes, have other electrical components and have different shape and sizes.

The exemplary embodiments described herein are for purposes of illustration and are not intended to be limiting. Therefore, those skilled in the art will recognize that other embodiments could be practiced without departing from the scope and spirit of the claims set forth below.

The invention claimed is:

1. An integrated battery powered hard disk drive, comprising:
  i) a disk drive apparatus including:
    a spindle with one or more magnetic disks on a front surface of a base, wherein said front surface has a spindle shaft;
    one or more actuator assemblies on said front surface of said base;
  ii) at least one battery on said front surface of said base to provide power for said disk drive apparatus;
  iii) a cover to cover said front surface of said base forming a first chamber for containing said disk drive apparatus and a second chamber for containing said battery; and iv) a seal to seal said first chamber to hermetically contain at least one gas inside said first chamber, wherein an integrated battery powered hard disk drive can be assembled and operate as a functional hard disk drive.

2. The integrated battery powered hard disk drive of claim 1, wherein said base includes ceramic material.

3. The integrated battery powered hard disk drive of claim 1, wherein said base includes zirconia.

4. The integrated battery powered hard disk drive of claim 1, wherein said at least one battery is a lithium polymer battery.

5. The integrated battery powered hard disk drive of claim 1, further comprising:
   at least one rotor assembly including a permanent magnet and a sleeve bearing to form at least one spindle assembly before forming said first chamber.

6. The integrated battery powered hard disk drive of claim 1, further comprising:
   a dual-module actuator.

* * * * *